(12) United States Patent
Nigam et al.

(10) Patent No.: US 12,163,728 B2
(45) Date of Patent: *Dec. 10, 2024

(54) WET GRANULATION FOR MANUFACTURE OF THERMAL INSULATION MATERIAL

(71) Applicant: WHIRLPOOL CORPORATION, Benton Harbor, MI (US)

(72) Inventors: Ashish Nigam, St. Joseph, MI (US); Shayta Roy, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/342,830

(22) Filed: Jun. 28, 2023

(65) Prior Publication Data

US 2023/0341173 A1 Oct. 26, 2023

Related U.S. Application Data

(63) Continuation of application No. 17/545,026, filed on Dec. 8, 2021, now Pat. No. 11,740,009, which is a continuation of application No. 17/042,300, filed as application No. PCT/US2018/026881 on Apr. 10, 2018, now Pat. No. 11,226,153.

(51) Int. Cl.
| | |
|---|---|
| *F25D 23/06* | (2006.01) |
| *C04B 14/18* | (2006.01) |
| *C04B 14/24* | (2006.01) |
| *C04B 103/56* | (2006.01) |
| *F16L 59/02* | (2006.01) |

(52) U.S. Cl.
CPC ............ *F25D 23/065* (2013.01); *C04B 14/18* (2013.01); *C04B 14/24* (2013.01); *F16L 59/028* (2013.01); *C04B 2103/56* (2013.01); *F25D 2201/122* (2013.01); *F25D 2201/14* (2013.01)

(58) Field of Classification Search
CPC ............... F25D 23/065; F25D 2201/14; F25D 2201/122; F25D 2323/06; C04B 14/18; C04B 14/24; C04B 2103/56; F16L 59/028

See application file for complete search history.

(56) References Cited

U.S. PATENT DOCUMENTS

| | | | | |
|---|---|---|---|---|
| 6,132,837 A | * | 10/2000 | Boes | F16L 59/065 156/286 |
| 6,221,456 B1 | * | 4/2001 | Pogorski | E04B 1/803 220/62.15 |

(Continued)

*Primary Examiner* — Daniel J Rohrhoff
(74) *Attorney, Agent, or Firm* — Price Heneveld LLP

(57) ABSTRACT

An appliance cabinet includes a structural envelope having an exterior surface and an interior surface that defines an insulating cavity, wherein the insulating cavity defines an at least partial vacuum. A plurality of silica-based agglomerates are disposed within the insulating cavity, wherein each agglomerate of the plurality of silica-based agglomerates includes silica-based powder insulation material that is water-densified and is at least substantially free of a material binder. A secondary insulation material is disposed within interstitial spaces defined between the plurality of silica-based agglomerates, wherein the plurality of silica-based agglomerates defines an interior structure that resists inward compressive forces exerted as a result of the at least partial vacuum defined within the insulating cavity.

12 Claims, 5 Drawing Sheets

(56) References Cited

U.S. PATENT DOCUMENTS

| | | | | |
|---|---|---|---|---|
| 7,005,181 B2* | 2/2006 | Albert | ................... | C04B 35/524 |
| | | | | 521/181 |
| 7,360,371 B2* | 4/2008 | Feinauer | ............... | F25D 17/042 |
| | | | | 62/169 |
| 7,521,485 B2 | 4/2009 | Albert et al. | | |
| 8,071,657 B2 | 12/2011 | Albert et al. | | |
| 8,436,061 B2 | 5/2013 | Albert et al. | | |
| 9,056,952 B2* | 6/2015 | Eilbracht | ............... | C08J 9/0066 |
| 9,828,287 B2 | 11/2017 | Swift et al. | | |
| 10,105,928 B2 | 10/2018 | Deka et al. | | |
| 11,162,630 B2 | 11/2021 | Deka et al. | | |
| 11,226,153 B2* | 1/2022 | Nigam | ................... | C04B 30/00 |
| 11,740,009 B2* | 8/2023 | Nigam | ................. | F25D 23/065 |
| | | | | 312/406 |
| 2002/0114937 A1* | 8/2002 | Albert | ....................... | C08J 9/28 |
| | | | | 428/69 |
| 2009/0324915 A1* | 12/2009 | Swift | ................... | C03C 25/325 |
| | | | | 428/219 |
| 2013/0068990 A1* | 3/2013 | Eilbracht | .............. | F16L 59/065 |
| | | | | 252/62 |
| 2014/0166926 A1* | 6/2014 | Lee | ....................... | C04B 38/085 |
| | | | | 252/181.2 |
| 2017/0157890 A1* | 6/2017 | Deka | ........................ | B32B 5/16 |
| 2017/0160001 A1 | 6/2017 | Deka et al. | | |
| 2019/0144343 A1* | 5/2019 | Deka | ....................... | C04B 14/24 |
| | | | | 428/76 |
| 2019/0145572 A1* | 5/2019 | Deka | .................. | C04B 38/0038 |
| | | | | 156/286 |
| 2021/0018254 A1 | 1/2021 | Nigam | | |

* cited by examiner

WET GRANULATION FOR MANUFACTURE OF THERMAL INSULATION MATERIAL

CROSS-REFERENCE TO RELATED APPLICATION

The present application is a continuation of U.S. patent application Ser. No. 17/545,026 filed Dec. 8, 2021, now U.S. Pat. No. 11,740,009, which is a continuation of U.S. patent application Ser. No. 17/042,300 filed Sep. 28, 2020, now U.S. Pat. No. 11,226,153, which is a national stage of PCT/US2018/026881 filed Apr. 10, 2018, all of which are entitled WET GRANULATION FOR MANUFACTURE OF THERMAL INSULATION MATERIAL, the entire disclosures of which are hereby incorporated herein by reference.

FIELD OF THE DEVICE

The device is in the field of insulation systems for use in various appliances, and more specifically, a silica-based insulation system that is formed into agglomerates or aggregates for providing internal structural support within various vacuum insulated structures.

SUMMARY

In at least one aspect, a method for forming a granulated insulation material for use in an appliance cabinet includes combining a powder insulation material and water to define a partially wetted insulation material. The wetted insulation material is mixed to define a plurality of wet insulation granules. The water is evaporated from the wet insulation granules to define a plurality of dry insulation agglomerates, wherein the plurality of wet insulation granules and the plurality of dry insulation agglomerates are substantially the same size.

In at least another aspect, a method for forming a vacuum insulated structure for use in an appliance includes combining a silica-based powder insulation material and water to define a partially wetted insulation material. The wetted insulation material is mixed to define a plurality of wet insulation granules. The water from the wet insulation granules is evaporated to define a plurality of dry insulation agglomerates. The dry insulation agglomerates are disposed within an insulating cavity defined within a structural envelope. Air is expressed from the insulating cavity to define an at least partial vacuum within the insulating cavity.

In at least another aspect, an appliance cabinet includes a structural envelope having an exterior surface and an interior surface that defines an insulating cavity, wherein the insulating cavity defines an at least partial vacuum. A plurality of silica-based agglomerates are disposed within the insulating cavity, wherein each agglomerate of the plurality of silica-based agglomerates includes silica-based powder insulation material that is water-densified and is at least substantially free of a material binder. A secondary insulation material is disposed within interstitial spaces defined between the plurality of silica-based agglomerates, wherein the plurality of silica-based agglomerates defines an interior structure that resists inward compressive forces exerted as a result of the at least partial vacuum defined within the insulating cavity.

These and other features, advantages, and objects of the present device will be further understood and appreciated by those skilled in the art upon studying the following specification, claims, and appended drawings.

DETAILED DESCRIPTION OF EMBODIMENTS

Figure 1:
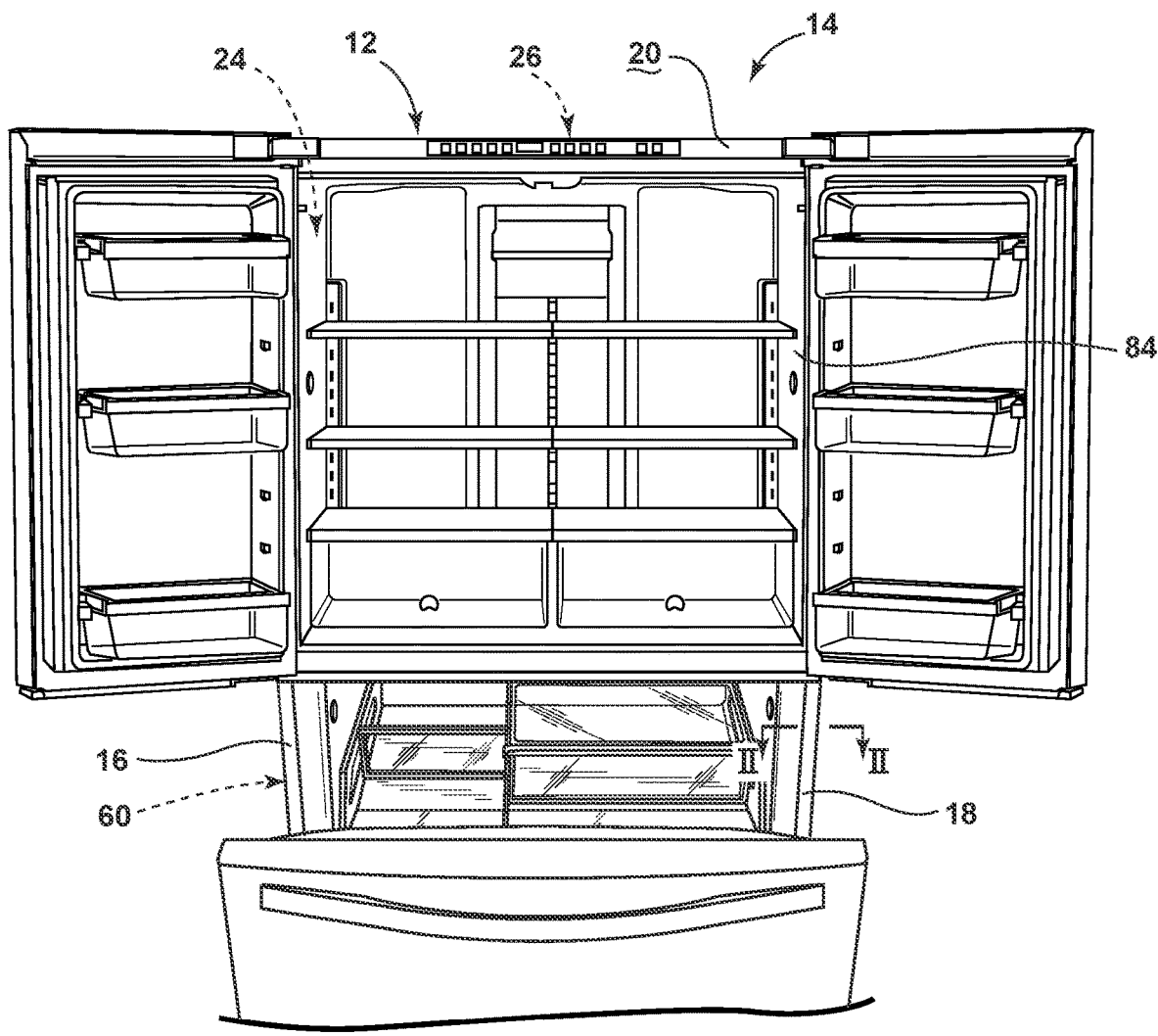
FIG. 1 is a front perspective view of an appliance that incorporates an aspect of the granulated insulation material.
Figure 2:
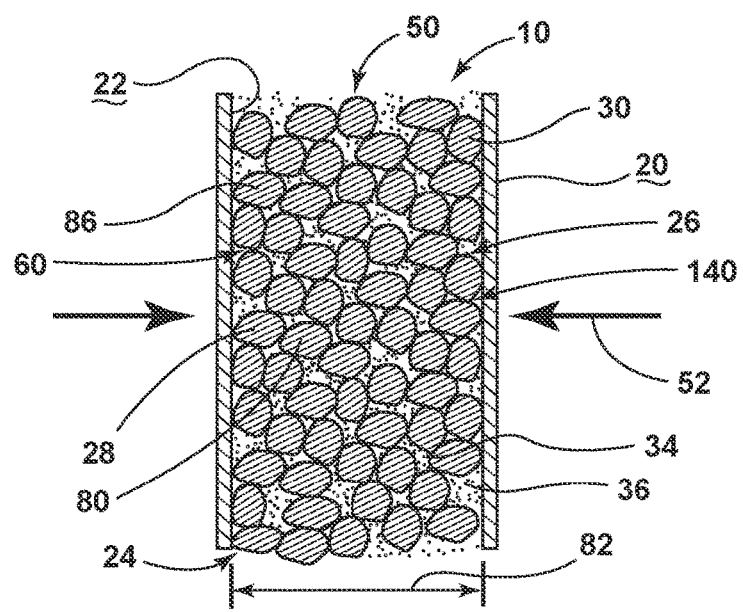
FIG. 2 is a cross-sectional view of the appliance of FIG. 1, taken along line II-II.
Figure 3:
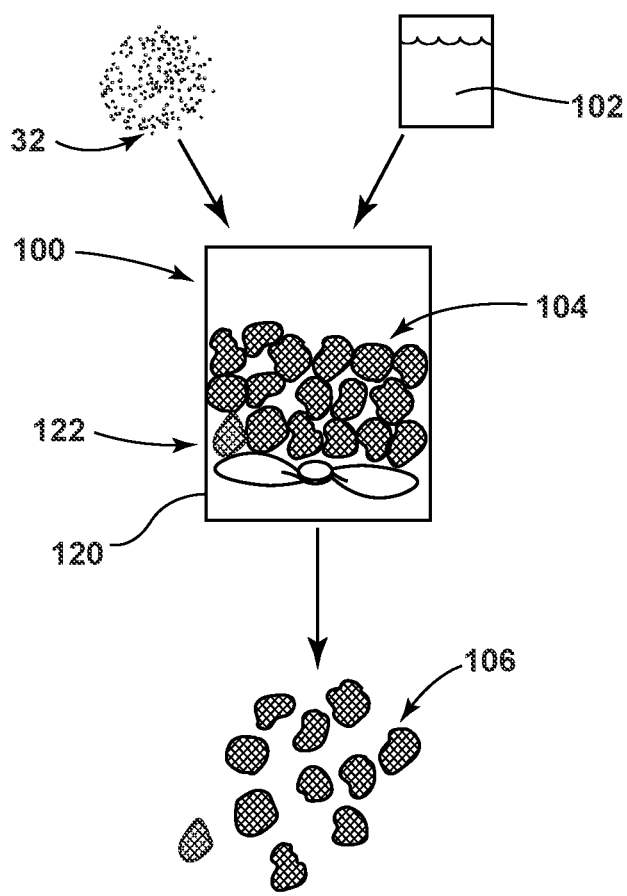
FIG. 3 is a schematic diagram illustrating a method for forming wet insulation granules that can be later converted into an aspect of the granulated insulation material for use in vacuum insulated structures.
Figure 4:
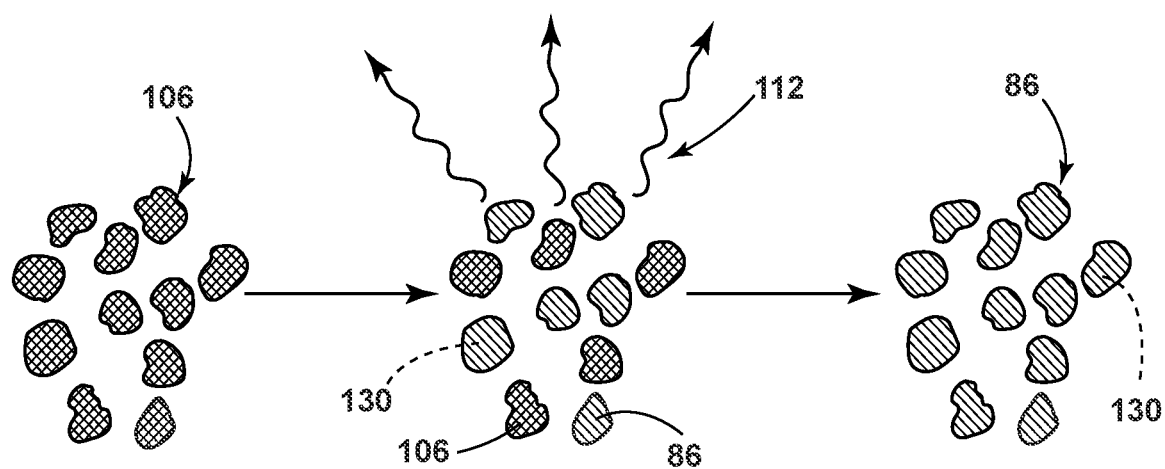
FIG. 4 is a schematic diagram illustrating a process for converting the wet insulation granules into the granulated insulation material.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

With respect to FIGS. 1-4, reference numeral 10 generally refers to a granulated insulation material that can be used within a cabinet 12 for an appliance 14 and typically within vacuum insulated structures 16 for various residential and commercial appliances and fixtures. According to various aspects of the device, the cabinet 12 can include a structural envelope 18 having an exterior surface 20 and an interior surface 22 that defines an insulating cavity 24. The insulating cavity 24, upon formation of the cabinet 12, can define an at least partial vacuum 26. A plurality of silica-based agglomerates 28 and/or silica-based aggregates 30 that make up the granulated insulation material 10 can be disposed within the insulating cavity 24. Where the silica-based agglomerates 28 are used, each agglomerate 28 of the plurality of silica-based agglomerates 28 includes a silica-based powder insulation material 32 that is water-densified and is at least substantially free of a material binder. A secondary insulation material 34 can be disposed within interstitial spaces 36 that are defined between the silica-based agglomerates 28, and where used, the silica-based aggregates 30.

The granulated insulation material 10 that can be made up of a plurality of silica-based agglomerates 28 and/or aggregates 30 defines an interior structure 50 that resists inward compressive forces 52 that may be exerted as a result of the at least partial vacuum 26 defined within the insulating cavity 24. In this manner, when the at least partial vacuum 26 is formed within the insulating cavity 24, the pressure differential between the insulating cavity 24 and areas external to the structural envelope 18 generate inward compressive forces 52 that may result in deformation, aesthetic demarcation and other types of deflection that can be visible on the exterior surface 20 of the structural envelope 18. The use of the granulated insulation material 10 having at least one of the aggregates 30 and agglomerates 28 substantially occupies the insulating cavity 24 and serves to engage the interior surface 22 of the structural envelope 18 and resist the inward compressive forces 52 generated by the at least partial vacuum 26.

Figure 5:
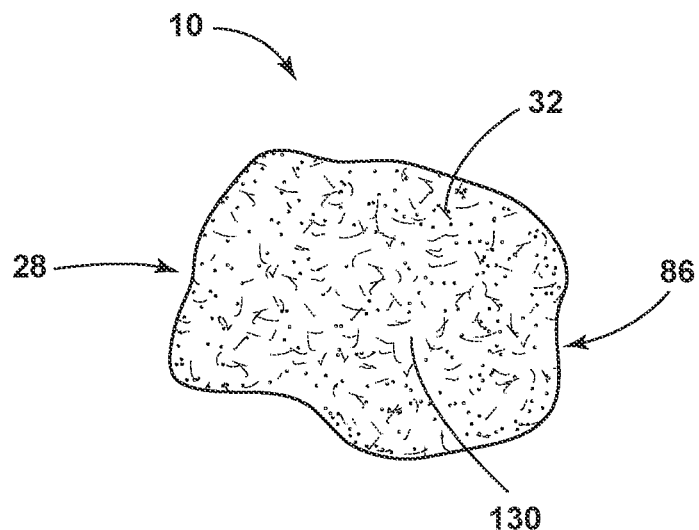
FIG. 5 is a cross-sectional view of an aspect of a dry insulation agglomerate.
Figure 6:
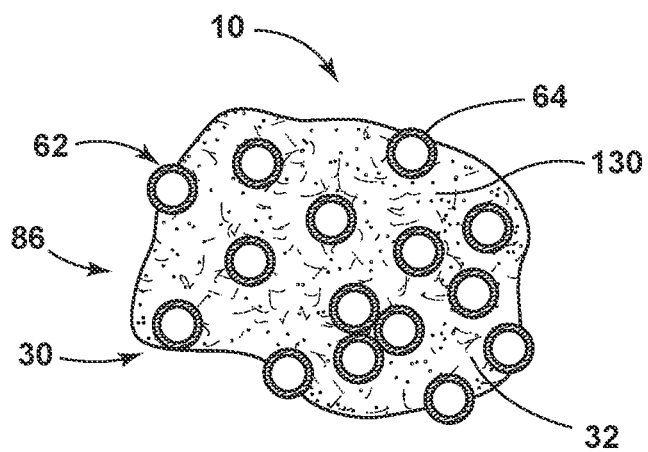
FIG. 6 is a cross-sectional view of an aspect of a dry insulation aggregate formed of multiple insulation materials.
Figure 7:
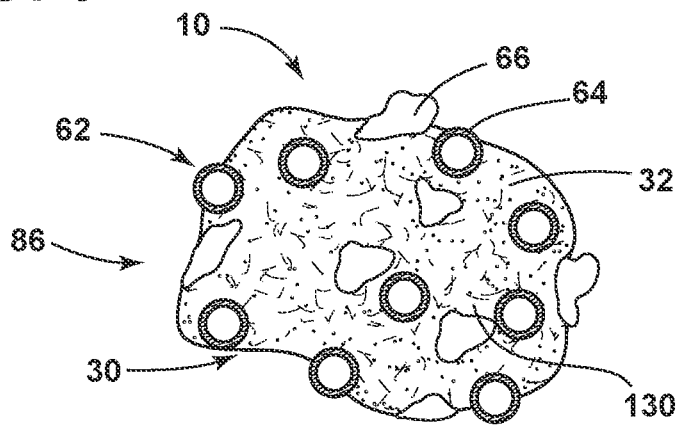
FIG. 7 is a cross-sectional view of an aspect of a dry insulation aggregate formed of multiple insulation materials.
Figure 8:
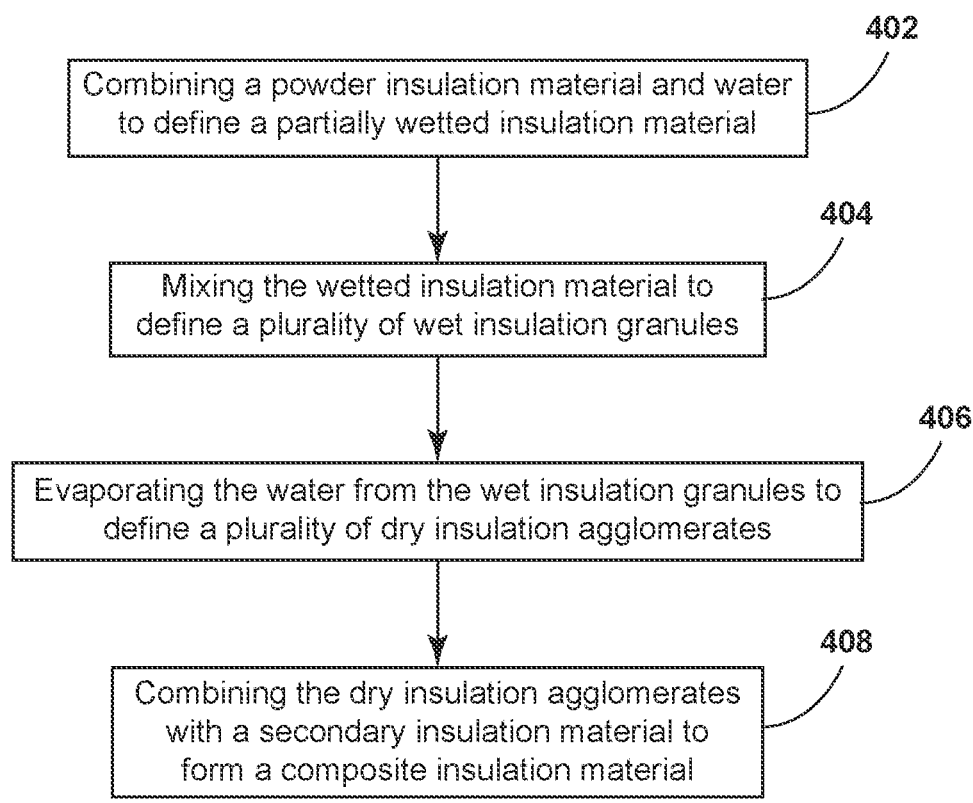
FIG. 8 is a linear flow diagram illustrating an aspect of a method for forming a granulated insulation material for use in an appliance cabinet.
Figure 9:
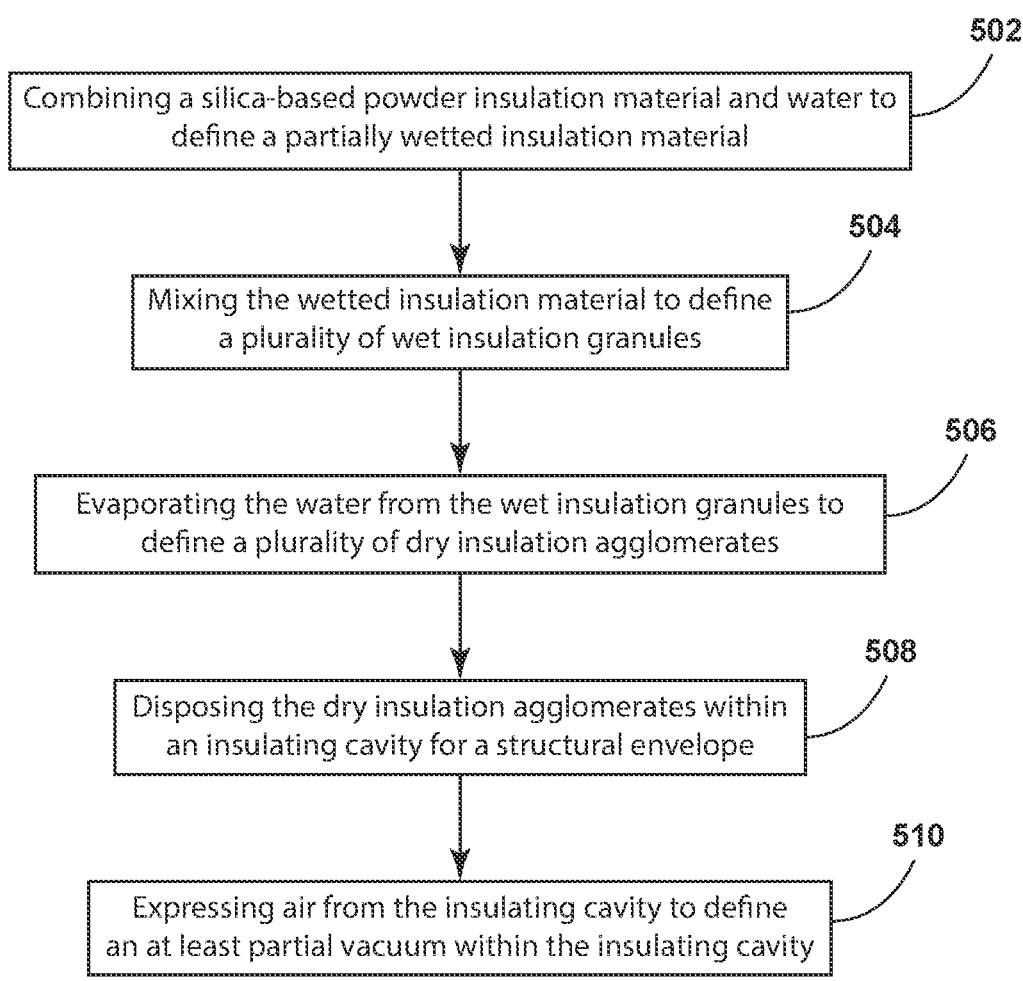
FIG. 9 is a linear flow diagram for a method of forming a vacuum insulated structure for use in an appliance.

Referring now to FIGS. 5-7, the granulated insulation material 10 can include silica-based agglomerates 28 that are exemplified in FIG. 5. These silica-based agglomerates 28 are typically made of the silica-based powder insulation material 32. The silica-type material can include, but is not limited to, precipitated silica, fumed silica, combinations thereof and other similar silica-based materials. These agglomerates 28 are generally free of additional insulating materials with the possible exception of an insulating gas 60 that may be allowed to infiltrate and replace air within various cavities and spaces defined within the silica-based agglomerate 28. The aggregates 30 that may form at least a portion of the granulated insulation material 10 typically include additional insulating particles in the form of secondary components 62. These secondary components 62 can be in the form of glass microspheres 64, perlite microspheres 66, various opacifiers, combinations thereof, and other similar insulating components that supplement and cooperate with the powder insulation material 32. The use of these additional secondary components 62 can serve to increase the compressive strength of each particle of the granulated insulation material 10. These secondary components 62 of the granulated insulation material 10 can also serve to increase the insulating performance of the granulated insulation material 10. The secondary components 62 can also act as an anchor material that assists in maintaining the integrity of each aggregate 30 of the granulated insulation material 10. While the silica-based powder insulation material 32 is held together as a result of the water-based densification process, the addition of the secondary components 62 can further add to the retaining properties of each aggregate 30. The process for forming the various agglomerates 28 and aggregates 30 of the granulated insulation material 10 will be described more fully below.

Referring again to FIG. 2, when the granulated insulation material 10, made up of the agglomerates 28, is disposed within the insulating cavity 24, each agglomerate 28 of the plurality of silica-based agglomerates 28 is in direct engagement with at least one adjacent agglomerate 80 of the plurality of silica-based agglomerates 28. In this manner, the interior structure 50 defined by the granulated insulation material 10 extends substantially through the insulating cavity 24 and the various agglomerates 28 support one another to provide the interior structure 50 for maintaining a consistent width 82 of the various walls 84 for the structural envelope 18 of the cabinet 12. The same is true where the granulated insulation material 10 is made up of the aggregates 30. In either instance, the granules of the granulated insulation material 10 form the interior structure 50. These granules can include either agglomerates 28, aggregates 30, or both.

As discussed previously, at least a portion of the granulated insulation material 10 can be in the form of a silica-based aggregate 30 having at least one of the secondary components 62 included therein. Again, these secondary components 62 can include, but are not limited to, perlite microspheres 66, hollow and/or solid glass microspheres 64, at least one opacifier, combinations thereof, and other similar insulating materials. In various aspects of the device, the agglomerates 28 and aggregates 30 cooperate to define the interior structure 50.

Referring again to FIG. 2, the secondary insulation material 34 that is included within the insulating cavity 24 can be in the form of at least one of a silica-based material, an insulating gas 60, perlite microspheres 66, glass microspheres 64, at least one opacifier, glass fiber, combinations thereof, and other similar insulating materials that can be used to occupy the various interstitial spaces 36 defined between the granules of the granulated insulation material 10. Where an opacifier is used, the opacifier can include, but is not limited to, carbon black, silicon carbide, zinc oxide, rice husk ash, and titanium oxide, combinations thereof and other similar materials that reduce radiative thermal conductivity.

According to various aspects of the device, the various agglomerates 28 and aggregates 30 of the granulated insulation material 10 can be formed during a binding process 100 that includes the use of water 102 as the binding agent. Typically, only water 102 is used as the binding agent. During this binding process 100, the silica-based powder insulation material 32 and any secondary components 62 are combined together and water 102 is added to the silica-based powder insulation material 32 to form a wetted insulation material 104 that defines a plurality of wet insulation granules 106. These wet insulation granules 106 are then dried to form dry insulation agglomerates 28, and, where the secondary components 62 are used, dry insulation aggregates 30. These aggregates 30 and agglomerates 28 can be held together as a result of the clumping tendency of the silica-based powder insulation material 32 that utilizes the Van der waals force that can tend to cause individual particles to cling to one another. By forming the silica-based powder insulation material 32 into the aggregates 30 and agglomerates 28, the individual granules of the granulated insulation material 10 have added compressive strength to resist the inward compressive forces 52 generated by the at least partial vacuum 26 defined within the insulating cavity 24. The aggregates 30 and agglomerates 28 of the granulated insulation material 10 also provide better flowability for disposing the granulated insulation material 10 within the insulating cavity 24 of the structural envelope 18. The granulated insulation material 10 tends to pour or flow with a much greater consistency and efficiency as compared to powder-based insulation materials. Accordingly, the use of the granulated insulation material 10 provides for a more efficient and consistent filling of the insulating cavity 24 of the structural envelope 18 and also provides for less waste when compared to pouring of powder-based insulation materials.

Additionally, the use of water 102 as the binding agent provides for an environmentally responsible and reusable substance to serve as the binding agent for the aggregates 30 and agglomerates 28. Moreover, the use of water 102 in combination with the Van der waals forces used to hold the aggregates 30 and agglomerates 28 together can be used as a substantially temporary binding agent. The water 102 can be added to the silica-based powder insulation material 32 and then removed during a heating process or drying process where substantially all of the water 102 within the aggregates 30 and agglomerates 28 is removed. Again, this process for forming the various aggregates 30 and agglomerates 28 of the granulated insulation material 10 will be described more fully below.

Referring now to FIGS. 1-4 and 8, having described various aspects of the granulated insulation material 10 and the agglomerates 28 and aggregates 30 that make up this granulated insulation material 10, a method 400 is disclosed for forming the granulated insulation material 10 for use in an appliance cabinet 12. According to the method 400, step 402 includes combining a powder insulation material 32 and water 102, or another binder, to define a partially wetted insulation material 104. As discussed above, the powder insulation material 32 can be defined by the silica-based powder insulation material 32 as well as various secondary components 62 that are added to the silica-based powder insulation material 32. The identity of the granulated insulation material 10 as having aggregates 30 and agglomerates 28 can depend upon whether the secondary components 62 are added to the silica-based powder insulation material 32. In step 402 where the powder insulation material 32 is combined with water 102, the amount of water 102 is typically sufficient to only partially wet the powder insulation material 32 to form clumps of the powder insulation material 32. These clumps can take the form of the wetted insulation material 104. In this step 402, if a slurry is formed, it is typically indicative of too much water 102 being added. The goal of this step 402 is to provide enough water 102 to the powder insulation material 32 to form a generally granular composition of only slightly wetted clumps of the powder insulation material 32.

According to the method 400, as exemplified in FIGS. 1-4 and 8, step 404 includes mixing the wetted insulation material 104 to define a plurality of wet insulation granules 106. This mixing step 404 can be performed in a mixer 120, on rollers, within a drum, or within another similar mixing apparatus. The mixing step 404 can also use various agitators, vibrating mechanisms, impellers, and other mixing agents for converting the partially wetted insulation material 104 into the plurality of wet insulation granules 106. The size of the wet insulation granules 106 and the final dry granules 86 can be determined based upon various factors. These factors can include, but are not limited to, the sequence and parameters of the mixing operation 122, the size of the mechanism performing the mixing, the amount of water 102 added to the powder insulation material 32, the amount of secondary components 62, if any, incorporated within the powder insulation material 32, and other similar factors. The sequence and parameters of the mixing operation 122 can include the length of mixing, the speed of the mixing apparatus, modifications and modulations of the mixing speed during performance of the mixing operation 122, the amount of the wet insulation granules 106 included within the mixing apparatus, combinations thereof, and other similar mixing parameters.

Referring again to FIGS. 1-4 and 8, the method 400 also includes a step 406 of evaporating the water 102 from the wet insulation granules 106 to define a plurality of dry insulation agglomerates 28. As discussed above, where the secondary components 62 are included within the powder insulation material 32, performing this evaporating operation 112 will be used to define a plurality of aggregates 30. This evaporating step 406 can be performed through various operations that can include, baking the wet insulation granules 106, placing the wet insulation granules 106 within a dry or arid environment, various heating operations, drying operations using a decreased pressure environment or an at least partial vacuum, and other similar operations that can be used to evaporate water 102 from the wet insulation granules 106.

Typically, as a result of this evaporating step 406, the plurality of wet insulation granules 106 and the plurality of dry insulation agglomerates 28 (or aggregates 30) have a substantially similar size. In this manner, as water 102 is removed during this evaporating step 406, water 102 is evaporated from within each granule 86 of the granulated insulation material 10. The space previously occupied by water 102 may tend to form various air spaces or pores 130 defined within each granule 86 of the granulated insulation material 10. According to various aspects of the device, it is contemplated that some shrinkage of each granule 86 may occur as a result of the evaporating step 406.

As discussed above, the amount of water 102 included within the powder insulation material 32 is substantially minimal such that each wet insulation granule 106 includes a minimal amount of water 102 as a temporary binding agent. The various particles of the wetted insulation material 104 and ultimately, the dry insulation agglomerates 28 and dry insulation aggregates 30 are at least partially held together through the Van der waals force. It is also contemplated that trace amounts of water 102 may also be used to hold the various granules 86 of the granulated insulation material 10 together. In this manner, the dry insulation agglomerates 28 and/or dry insulation aggregates 30 can include no water 102 or can include small amounts of water 102. According to the various aspects of the device and aspects of the various methods, this process for forming the granulated insulation material 10 can be formed using water 102 as the only additive to the powder insulation material 32 and, where present, the secondary components 62. Additionally, the evaporating step 406 of method 400 can be accomplished in a manner that is free of material drying agents and using only heat, a decreased pressure environment, an at least partial vacuum and/or latent evaporation of water 102 to form the dry form of the granulated insulation material 10.

According to various aspects of the device, the granulated insulation material 10 formed according to method 400 can be used to form a composite insulation material 140 that includes the dry insulation agglomerates 28 and/or dry insulation aggregates 30 in combination with the secondary insulation material 34. In such an aspect of the device, the method 400 can include a step 408 that includes combining the granulated insulation material 10 with the secondary insulation material 34. As discussed previously, this secondary insulation material 34 substantially occupies various interstitial spaces 36 that are defined between the granules 86 of dry insulation agglomerates 28 and/or dry insulation aggregates 30 of the granulated insulation material 10. Once formed, this composite insulation material 140 can be packaged for delivery, moved to a separate location, or disposed within the insulating cavity 24 of a structural envelope 18 for an appliance 14. It is also contemplated that the granulated insulation material 10 can be used by itself as the insulating material for use within the insulating cavity 24 of a structural envelope 18 for an appliance 14. The composite insulation material 140 can also be formed within the insulating cavity 24 where the granulated insulation material 10 is first placed therein and the secondary insulation material 34 is subsequently added to the granulated insulation material 10.

Referring now to FIGS. 1-4 and 9, a method 500 is also disclosed for forming a vacuum insulated structure 16 for use in an appliance 14. According to the method 500, a step 502 can include combining a silica-based powder insulation material 32 with water 102, or another binder, to define a partially wetted insulation material 104. As discussed previously, the amount of water 102 included within the silica-based powder insulation material 32 is substantially minimal and sufficient to tend the silica-based powder insulation material 32 into clumps that take the form of the wetted insulation material 104. The use of water 102 acts in combination with the Van der waals force to accomplish greater clumping of the silica-based powder insulation material 32. According to the method 500, step 504 includes mixing the wetted insulation material 104 to define a plurality of wet insulation granules 106. As discussed above, this mixing step 504, similar to the mixing step 404 for method 400, can include various mixing operations 122 and sequences and parameters as well various mixing mechanisms for accomplishing this step 504 of the method 500. According to the method 500, step 506 includes evaporating the water 102 from the wet insulation granules 106 to define a plurality of dry insulation agglomerates 28. The various evaporating operations 112 described herein may be used. The amount of water 102 included within each wet insulation granule 106 is substantially minimal such that only small amounts of water 102 will need to be evaporated from each wet insulation granule 106 during the evaporating operation 112.

According to the method 500, step 508 can include disposing the dry insulation agglomerates 28 and/or dry insulation aggregates 30 within an insulating cavity 24 defined within a structural envelope 18. As discussed above, the identity of the granulated insulation material 10 as having agglomerates 28 or aggregates 30 can depend upon whether the secondary components 62 of the powder insulation material 32 are included therein. Where the secondary components 62 are included, this material is typically in the form of the dry insulation aggregates 30 that include multiple materials, as discussed above. Additionally, this step 508 of disposing the dry insulation agglomerates 28 within the insulating cavity 24 can also include disposing a secondary insulation material 34 into the insulating cavity 24.

This secondary insulation material 34 can be premixed with the granulated insulation material 10 and disposed as a single composite insulation material 140 into the insulating cavity 24. In various aspects of the device, the secondary insulation material 34 can be subsequently disposed within the insulating cavity 24 and filtered between the granulated insulation material 10 to occupy the various interstitial spaces 36 defined between the aggregates 30 and/or agglomerates 28 of the granulated insulation material 10.

Once the insulating cavity 24 is substantially filled with the granulated insulation material 10 and, where desired, the secondary insulation material 34, the structural envelope 18 can be sealed and air is expressed from the insulating cavity 24 to define an at least partial vacuum 26 within the insulating cavity 24 (step 510). This step 510 of expressing air forms the at least partial vacuum 26 that can result in the inward compressive forces 52 that are exerted upon the exterior surface 20 of the structural envelope 18. In this manner, the plurality of dry insulation agglomerates 28 and/or dry insulation aggregates 30 define an interior structure 50 that resists these inward compressive forces 52 exerted on the exterior surface 20 of the structural envelope 18. The formation of the silica-based powder insulation material 32 into the aggregates 30 and agglomerates 28 forms the interior structure 50 that resists inward compression or deformation of the structural envelope 18 that may cause aesthetic demarcation and also thinning of the walls 84 of the structural envelope 18. Accordingly, the use of the granulated insulation material 10 serves to maintain a substantial width 82 or a thickness of the various walls 84 of the structural envelope 18. Additionally, the plurality of granules 86 of the granulated insulation material 10 operating in a cooperative fashion serves to resist this inward compression or deformation. The conglomeration of the plurality of aggregates 30 and agglomerates 28 of the granulated insulation material 10 operate in concert to resist this inward compressive force 52 and also resist degradation of the various granules 86 of the granulated insulation material 10.

Referring again to FIGS. 1-4 and 9, the amount of water 102 by weight that is used within step 502 for combining with the silica-based powder insulation material 32 is typically less than an amount of the silica-based powder insulation material 32 by weight. Accordingly, the wetted insulation material 104 includes substantially more silica-based powder insulation material 32 than water 102. Typically, the water 102 is in an amount sufficient to cause clumping of the powder insulation material 32 but insufficient to create a slurry or substantially wet material.

According to the method 500, the evaporating step 506 can be accomplished in a fashion substantially similar to that of step 406 from method 400 described above. Typically, the use of heat or arid environments will be used to accomplish this evaporating operation 112. It is contemplated that the use of blowing air can be used for assisting in the evaporation of the water 102.

According to various aspects of the device, the granulated insulation material 10 described herein can be used within various appliances 14. These appliances 14 can include, but are not limited to, refrigerators, freezers, coolers, laundry appliances, dishwashers, ovens, small appliances, water heaters, kitchen-type tools, and other similar residential and commercial appliances and fixtures. The granulated insulation material 10 can also be used in structural cabinets 12, vacuum insulated panels, and other similar insulating materials.

Where the secondary insulation material 34 is an insulating gas 60, the insulating gas 60 can be included within the insulating cavity 24 in a manner such that the insulating gas 60 infiltrates the interstitial spaces 36 defined between the granules 86 of the granulated insulation material 10 and replaces air within these interstitial spaces 36. This insulating gas 60 can also be disposed within the various pores 130 defined within the granules 86 of the granulated insulation material 10. Accordingly, through the use of the granulated insulation material 10 and one or more secondary insulation materials 34, substantially the entire insulating cavity 24 can be filled with materials having insulative properties greater than that of air or any one of the components alone. In this manner, the granulated insulation material 10 can serve as the base of a composite insulation structure that provides desired insulative performance and also resists inward deflection of the structural envelope 18 as a result of the at least partial vacuum 26 defined within the insulating cavity 24. Moreover, the use of the granulated insulation material 10 provides for an environmentally conscious and reusable binder in the form of water 102 that can be used to form the aggregates 30 and agglomerates 28 that make up the granulated insulation material 10. The process for forming a granulated insulation material 10 can be formed without non-water binders and without the use of material drying agents to remove water 102 from each granule 86. In instances where water 102 is the binder and where a non-water material acts as the binder, the dry form of the granulated insulation material 10 can include small amounts of water 102 or the non-water material to assist in maintaining the granular form of the various granules 86 of the granulated insulation material 10.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width 82 of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. An insulating structure, the insulating structure comprising:
    a structural envelope having an exterior surface and an interior surface that defines an insulating cavity, wherein the insulating cavity defines an at least partial vacuum;
    dried silica-based agglomerates that are disposed within the insulating cavity, wherein each agglomerate of the dried silica-based agglomerates includes a silica-based powder insulation material that is water-densified using a temporary binder that includes at least water, the dried silica-based agglomerates being substantially free of the temporary binder; and
    a secondary insulation material that is disposed within interstitial spaces defined between the dried silica-based agglomerates, wherein the dried silica-based agglomerates define an interior structure that resists inward compressive forces exerted as a result of the at least partial vacuum defined within the insulating cavity.

2. The insulating structure of claim 1, wherein each agglomerate of the dried silica-based agglomerates is in direct engagement with at least one adjacent agglomerate of the dried silica-based agglomerates.

3. The insulating structure of claim 1, wherein the secondary insulation material is at least one of a silica-based material, insulating gas, perlite, glass microspheres, and an opacifier.

4. The insulating structure of claim 1, wherein a portion of the dried silica-based agglomerates are in direct engagement with the interior surface of the structural envelope.

5. The insulating structure of claim 1, wherein the temporary binder used in formation of the dried silica-based agglomerates is water.

6. The insulating structure of claim 1, wherein at least a portion of the agglomerates of the dried silica-based agglomerates defines a silica-based aggregate having at least one of perlite spheres, hollow microspheres and an opacifier.

7. The insulating structure of claim 1, wherein the insulating cavity includes an insulating gas.

8. The insulating structure of claim 1, wherein the structural envelope is an appliance cabinet.

9. The insulating structure of claim 1, wherein the structural envelope is a vacuum insulated panel.

10. The insulating structure of claim 1, wherein the secondary insulation material is an opacifier.

11. The insulating structure of claim 10, wherein the opacifier is at least one of carbon black, silicon carbide, zinc oxide, rice husk ash, and titanium oxide.

12. The insulating structure of claim 1, wherein the silica-based powder insulation material includes at least one of precipitated silica and fumed silica.

\* \* \* \* \*